United States Patent
Thornhill et al.

(10) Patent No.: US 12,400,165 B2
(45) Date of Patent: Aug. 26, 2025

(54) PRIORITIZED FLOW TESTING AND INCIDENT HANDLING

(71) Applicant: International Business Machines Corporation, Armonk, NY (US)

(72) Inventors: Matthew Richard James Thornhill, London (GB); David Jon Griffin, Reigate (GB); Keith Jeremy Posner, London (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 18/345,687

(22) Filed: Jun. 30, 2023

(65) Prior Publication Data
US 2025/0005484 A1 Jan. 2, 2025

(51) Int. Cl.
*G06Q 10/06* (2023.01)
*G06Q 10/0633* (2023.01)
*G06Q 10/0637* (2023.01)
*G06Q 10/0639* (2023.01)

(52) U.S. Cl.
CPC ..... *G06Q 10/0633* (2013.01); *G06Q 10/0637* (2013.01)

(58) Field of Classification Search
CPC .............. G06Q 10/0633; G06Q 10/0637
See application file for complete search history.

(56) References Cited

U.S. PATENT DOCUMENTS

| | | | |
|---|---|---|---|
| 9,537,963 B2* | 1/2017 | Chen | G06F 16/955 |
| 10,455,034 B2* | 10/2019 | Xu | G06F 16/24578 |
| 11,327,822 B2* | 5/2022 | Ciabarra, Jr. | G06F 11/3006 |
| 2012/0191494 A1* | 7/2012 | Heiman | G06Q 10/063 705/7.11 |
| 2013/0152047 A1* | 6/2013 | Moorthi | G06F 8/71 717/124 |
| 2019/0163618 A1* | 5/2019 | Akiona | G06Q 10/06 |
| 2021/0191843 A1* | 6/2021 | Stocker | G06F 11/3698 |
| 2021/0216845 A1* | 7/2021 | Walters | H04L 67/34 |
| 2022/0029904 A1* | 1/2022 | Zenine | H04L 41/40 |
| 2022/0036477 A1* | 2/2022 | Diaz | H04L 67/75 |

(Continued)

FOREIGN PATENT DOCUMENTS

CN 105138446 A 12/2015

*Primary Examiner* — Chris Parry
*Assistant Examiner* — Hassan Abdur-Rahman Khan
(74) *Attorney, Agent, or Firm* — Rakesh Roy, Esq.; Matthew M. Hulihan, Esq.; Heslin Rothenberg Farley & Mesiti P.C.

(57) ABSTRACT

Prioritized flow testing and incident handling includes tracking computerized interactions of users interacting with system(s), identifying user flows, each being a sequence of one or more of the tracked computerized interactions, determining a collection of user flows of the user flows, each being associated with a measured beneficial impact, assigning impact metrics to the collection of user flows, each being assigned an impact metric commensurate with the measured beneficial impact associated with that user flow, and based on the assigned impact metrics, selecting synthetic tests of common flows represented by the collection of user flows and a prioritization of the synthetic tests, each synthetic test simulating a sequence of user interactions to progress through a common flow of the common flows.

17 Claims, 4 Drawing Sheets

(56) References Cited

U.S. PATENT DOCUMENTS

2022/0156175 A1\* 5/2022 Periyathambi .......... G06F 40/20
2024/0305543 A1\* 9/2024 Singarayan ......... H04L 41/5009
2024/0354789 A1\* 10/2024 Garvey .................. G06N 20/00

\* cited by examiner

PRIORITIZED FLOW TESTING AND INCIDENT HANDLING

BACKGROUND

The monitoring and repair of information technology (IT) services in environments such as a data centers or cloud/hybrid environments takes places across many layers that include code, data, runtime, middleware, operating system, virtualization, server, storage, and networking layers. Across these many layers, organizations and their users expect services and the components supporting them to operate correctly and without failures. When failures occur, the teams supporting the services should know that an issue has occurred and should be aware how to diagnose and fix the issue.

IT service management software can aid support teams in the tracking and assignment of these issues. In some examples, issues are assigned to a member (operator) of a support team, and the operator is then responsible for resolving the issue. Often the operator accomplishes this by issuing a sequence of computer commands on affected systems. Issues are usually indicated by events that are emitted by devices and applications in an IT system in order to report their status. An event is a record containing structured data summarizing key attributes of an occurrence on a managed entity, which might be a network resource, some part of that resource, or other key element associated with the network, services, applications, or more generally any component of the aforementioned layers of the environment. More severe events usually indicate a fault condition in the managed environment and require human and/or automated operator intervention. Multiple events can indicate a single incident. In almost any situation, there is a desire when an incident occurs to determine an importance of the incident, for instance the relative importance of that incident compared to other ongoing incidents.

SUMMARY

Shortcomings of the prior art are overcome and additional advantages are provided through the provision of a computer-implemented method. The method tracks computerized interactions of a plurality of users interacting via user interfaces with one or more systems. The method additionally identifies, from the computerized interactions, a plurality of user flows. Each user flow of the plurality of user flows is a sequence of one or more of the tracked computerized interactions. The method determines a collection of user flows of the plurality of user flows. Each user flow of the collection of user flows is associated with a respective measured beneficial impact to an organization. Determining the collection of user flows includes determining first user flows. Each first user flow of the first user flows provides its associated respective measured beneficial impact by way of at least one computerized interaction of that first user flow. Determining the collection of user flows also includes determining second user flows. Each second user flow has a threshold correlation to one or more of the first user flows that occur sequentially after that second user flow. Additionally, the method assigns impact metrics to the collection of user flows. The method assigns each user flow of the collection of user flows a respective impact metric commensurate with the respective measured beneficial impact associated with that user flow. Further, the method selects, based on the assigned impact metrics, a collection of synthetic tests of a plurality of common flows represented by the collection of user flows and a prioritization of the collection of synthetic tests. Each synthetic test simulates a sequence of user interactions to progress through a respective common flow of the plurality of common flows.

Additional aspects of the present disclosure are directed to systems and computer program products configured to perform the methods described above and herein. The present summary is not intended to illustrate each aspect, every implementation, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
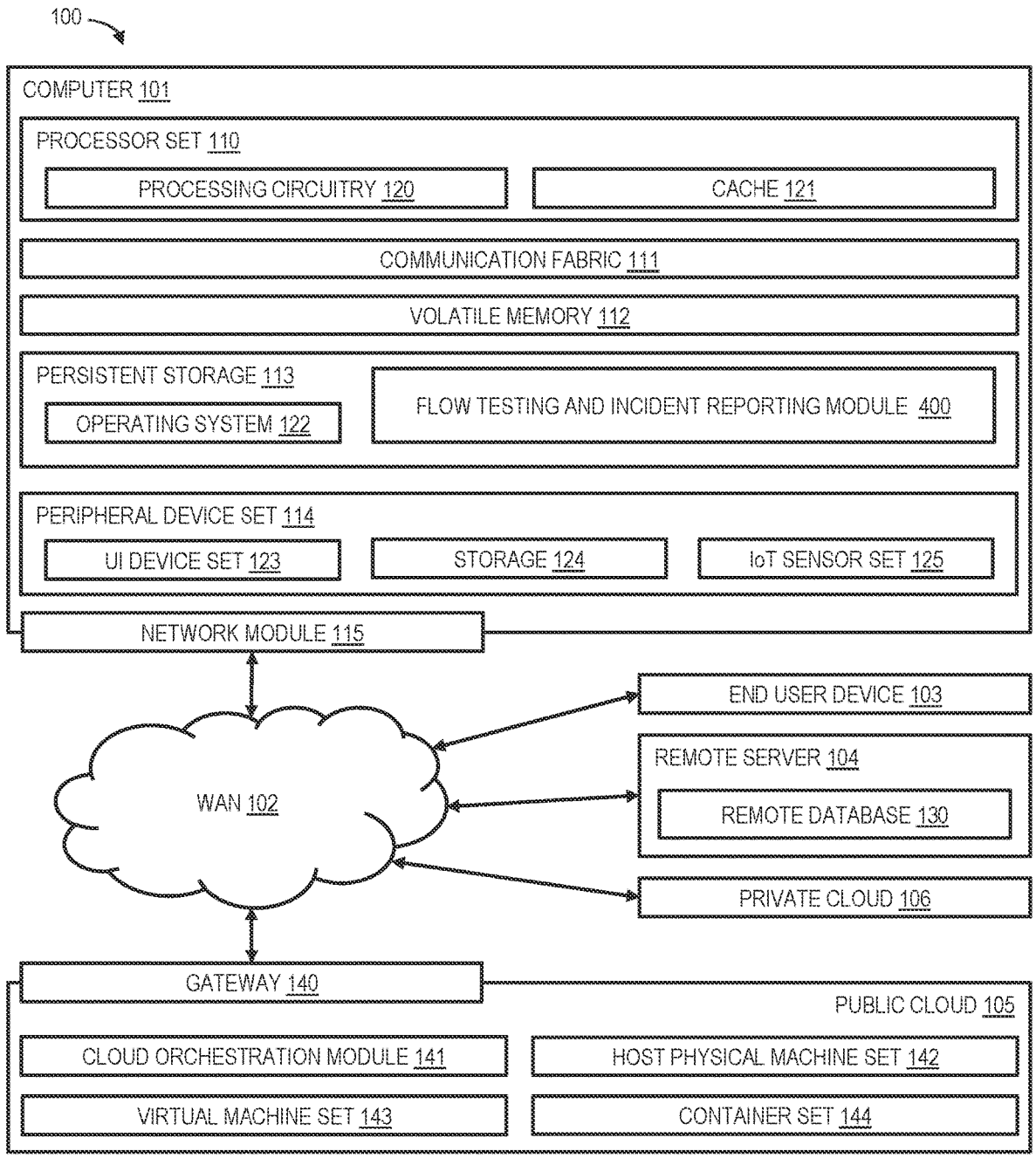
FIG. 1 depicts an example computing environment to incorporate and/or use aspects described herein.

The determination of the importance of an incident, such as a relative importance as compared to other ongoing incidents, can be difficult for an operator. Typically, the importance of an incident to an organization is directly correlated to the impact, to the organization, associated with that incident. The impact of a failure of a service provided as a flow/workflow through which users, such as organization customers, progress may be a cost associated with the service failure. If the flow is responsible for sales transactions, for example, then the impact might be the cost of losing a sale that would otherwise have occurred. It can therefore be beneficial to calculate an estimate of the cost so that operators can prioritize their incident investigation and resolution activities.

Additionally, in order to discover these incidents in the first place, it is desired to put some forms of monitoring in place that can detect the associated fault conditions. Higher rates of monitoring and monitoring of a greater number of scenarios will typically have an associated cost, so it is desired to optimize which flows are monitored. A higher monitoring rate might result in operators learning about an incident earlier than they would have, but will also mean that the monitoring system will be under higher load. Therefore, which flows to monitor, how often to monitor each, what specific testing should be done for each monitored flow, and how to prioritize the handling of incidents (generated by a real user, generated by the testing, or both) are all variables that impact the organization.

Many organizations employ tracking systems within their systems (servers or any other systems with which users/customers interact via websites, mobile applications, native applications, installed software, etc.) in order to understand how users interact with the organization's offerings. These tracking systems can store information about the users' flows through the system, which of those flows result in a transaction or other beneficial impact to the organization, and what flows repeat visitors tend to undertake, as examples. By instrumenting any actions that provide a benefit to the organization (such as revenue-generating interactions), it is possible to attribute a measured beneficial impact to user flows and assign an impact metric to them. Flows that could have an impact metric assigned to them include flows that result in a transaction (or other interaction) that itself provides a measured benefit, as well as flows that are highly indicative of a future such transaction or interaction. By way of specific example and not limitation, a given user flow might include interactions by a user to visit the organization's e-commerce website, search for a product, add the product to the user's cart, and then purchase the product for $50. The measured beneficial impact may be the certain revenue amount ($50) or some other measured benefit to the organization derived from that transaction. In examples, the measured impact is an absolute quantity or value inherent in the interaction, for instance a payment of $50 in this example, or another benefit with a value. In addition, it might be determined that two days prior the user read a blog post about the product, and that the user previously proceeded through a second flow that included interactions by the user to visit the website and read the blog post about the product, before subsequently revisiting the website two days later to purchase the product via the first flow. In this case, the flow to make the purchase may be a first flow—the one that resulted in the transaction—and the second flow, which occurred temporally-prior to the first flow, may be used as a predictor that the first flow may occur, particularly if a significant number of other users engaged in the same behavior of reading the blog post (via the second flow) and subsequently purchasing the product (via the first flow).

Aspects described herein provide approaches of prioritizing the detection and remediation of incidents based on quantification of how much benefit given interactions by users as part of user flows provides to the organization. Beneficially-impactful flows through a web-based system can be detected using user tracking tools such as those described above. By sorting these based on resultant, measured beneficial impact (both direct via first flows and indirect via second flows), a system/method can determine which flows would cause the most loss (of that beneficial impact) if they were to fail. This information can then be used to dictate levels of monitoring, in the form of synthetic tests, to monitor those flows and the generation of an importance metric for any discovered incidents.

Synthetic tests are a known approach for testing flows through which users progress via interactions. Synthetic tests generally proceed through a given flow in the same way a real user would and provide a result. They are synthetic in that the interactions are not provided by real users/customers. Often the interactions are accomplished by an automated system providing simulated interactions with the goal of monitoring metrics of flow progression-items like success or failure scenarios, how long it takes to proceed through the flow, and other metrics. The idea is to identify potential failure points and address them through incident-response before real users experience those failure points. An importance metric attributed to a test failure result can be displayed to operators in order to help their prioritization and can additionally be used as a decision point for further automation.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing aspects of the present disclosure, such as code of flow testing and incident reporting module 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 400, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods. In computing environment 100, at least some of the instructions for performing the disclosed methods may be stored in block 400 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 400 typically includes at least some of the computer code involved in performing the disclosed methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
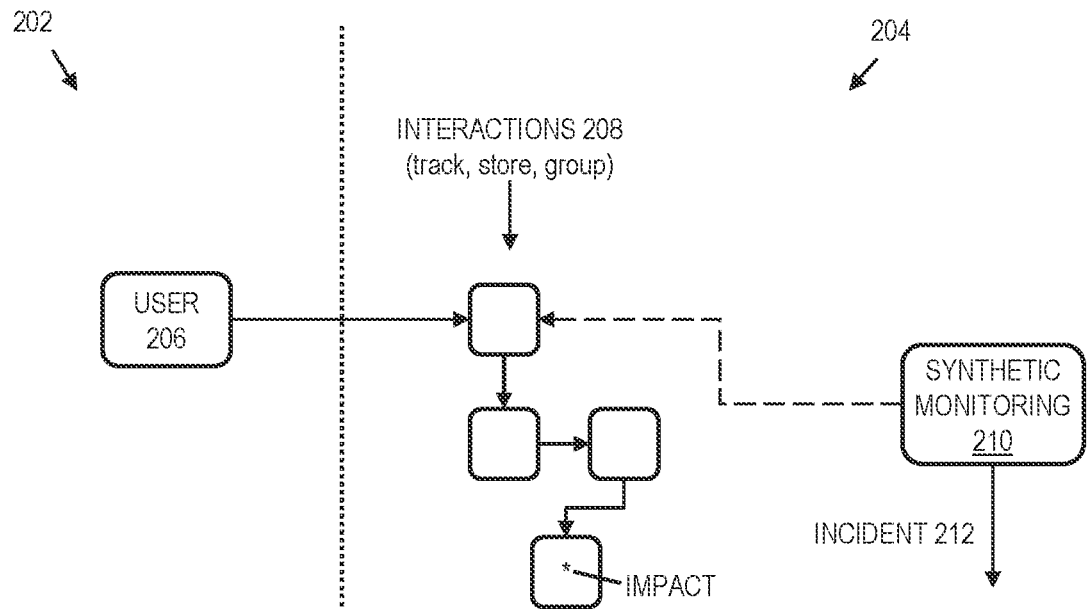
FIG. 2 depicts an example conceptual diagram of flow determination, monitoring, and incident reporting based on tracked user interactions, in accordance with aspects described herein.
Figure 3:
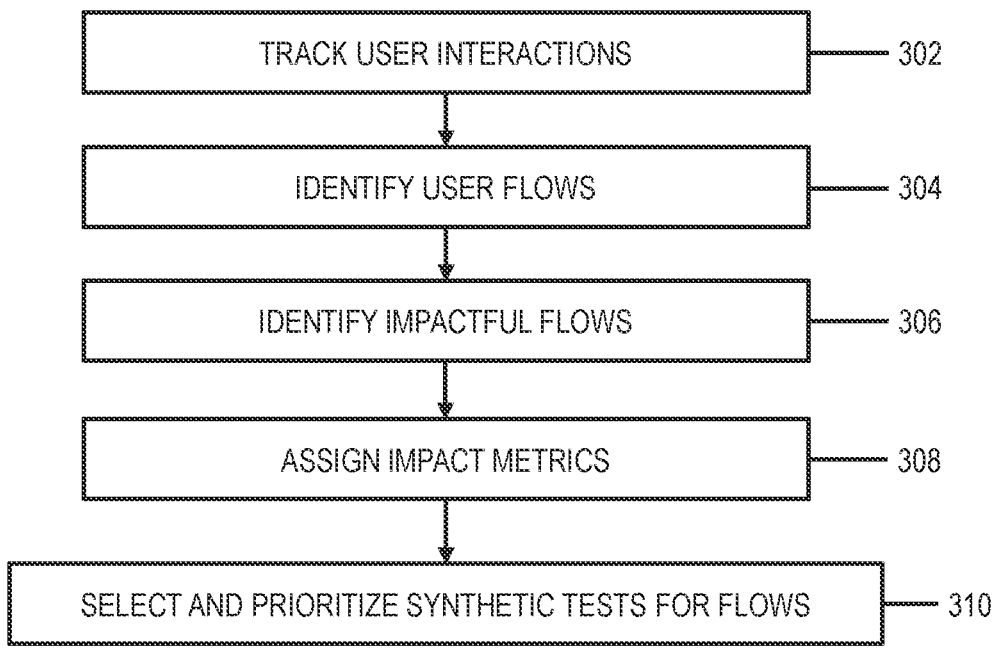
FIG. 3 depicts an example process for flow determination, monitoring, and incident reporting based on tracked user interactions, in accordance with aspects described herein.

Aspects of prioritized flow testing and incident reporting are now described with reference to FIGS. 2 and 3. FIG. 2 depicts an example conceptual diagram of flow determination, monitoring, and incident reporting based on tracked user interactions, in accordance with aspects described herein. FIG. 3 depicts an example process for flow determination, monitoring, and incident reporting based on tracked user interactions, in accordance with aspects described herein.

Referring initially to FIG. 2, client/user side (202) and server/organization side (204) aspects are presented. A user 206 has computerized interactions 208 with one or more backend systems (not depicted), for instance servers of an IT environment, such as one established to support an organization's service offerings. In examples, the systems host services via websites or other web services that are accessed via user interfaces. The users use mobile devices or other computer systems to engage in the computerized interactions with the organization's system(s), typically across network connections, such as the Internet.

A user flow includes the interactions 208 (the boxes) and the solid arrows indicating their sequence. Each user flow is an instance of a specific user progressing through a flow. The user flow in this example terminates with the box containing an asterisk, which in this case represents some measured beneficial impact that results from the interactions 208. In other embodiments of user flows, two or more interactions might collectively provide the measured beneficial impact, or each of two or more interactions of a user flow might provide their own respective measured beneficial impact, in which case the aggregate of these impacts will be the impact of the overall user flow.

In the example of FIG. 2, one user is depicted along with one user flow of that user, though it should be understood that many users might progress through the same flow via their own set of interactions with the systems on server side 204. In this regard, a 'common flow' as used herein refers to a defined flow through which users progress. Each user's set of interactions through that common flow presents one instance of that common flow, referred to herein as a 'user flow' or that user. It is possible that a user might progress partially or wholly through a common flow more than once, in which case each such progression could be considered its own user flow, or the progression could be aggregated and considered one user flow, optionally retaining information about the user's multiple progressions.

It should also be understood that many such flows might exist in the environment. That is, the interactions of users with backend system(s) of the server side 204 might be part of numerous different flows that are provided to the users. A given user might have numerous computerized interactions with system(s), the interactions being groups of interactions for various different flows. As noted previously, aspects can track these computerized interactions of the users interacting via user interfaces with the one or more systems. Those interactions can be tracked, stored, and analyzed. Further, the interactions can be grouped into identified user flows. These user flows can themselves be grouped by the common flow of which each is an instance. For example, 5 user flows of 5 different users who undertook the same set of interactions to load and view a blog post, and then navigate to a product page, could be grouped on the basis that they all are instances of a common flow, the common flow being the flow that load, views, and directs from a blog post.

Referring now to FIG. 3, which depicts an example process for flow determination, monitoring, and incident reporting, the process tracks and stores (302) computerized interaction of a plurality of users via user interfaces with one or more systems, for instance with a website hosted by a server, as one example. In accordance with this aspect, user interactions, such as clicks, navigations, transactions, etc. with the system(s) via websites, native clients, mobile applications, web systems, and the like are monitored and recorded.

By way of specific example, a process can, as users interact with a system, use instrumentation to send the interactions to an interaction database. An interactions could be, as an example, any input a user provides. Examples include but are not limited to a click, a button press, a page navigation, or entrance of text into a page. Various identifiers could be stored against each interaction in the database. Example identifiers include a unique identifier for the user, an identifier for the user's current session, an identifier for what the user has clicked, and an identifier for where the user has originated. In this aspect, tracking the computerized interactions includes storing metadata for each computerized interaction of the computerized interactions, and the metadata for a computerized interaction can include (i) a unique identifier of a user performing the computerized interaction, (ii) an identifier of a current session of the user; (iii) an identifier of an element with which the user interacted, and/or (iv) an originating identifier. Additionally, any interactions generating a measured beneficial impact to the organization may be tagged via the metadata with a measurement of that beneficial impact generated from the interaction. For example, a product purchase interaction on an e-commerce site could be tagged with the value of that transaction, which could be determined directly from the payment amount of that transaction.

The process of FIG. 3 proceeds by identifying (304), from the computerized interactions, a plurality of user flows. Each such user flow of the plurality of user flows is a sequence of one or more of those tracked computerized interactions. In this aspect, the interactions could be grouped, periodically or aperiodically, into user flows. The user interactions can be analyzed to produce a set of user sessions, each session representing a flow that the subject user took through a system. The identification of the plurality of user flows could include, for instance, analyzing the stored metadata and determining, as a user flow of the plurality of user flows, sequential user interactions of a single user in a single session. In this manner, the stored interactions can be analyzed in order to link together chains of user interactions to form the user flows through the system, and in some examples the user flows are delineated based on interactions that a single user made in sequence, where a session end point is determined by a gap in activity, and a session end terminates a user flow.

The process of FIG. 3 also includes identifying (306) impactful flows. In this aspect, the process determines a collection of user flows, of the plurality of user flows, where each user flow of the collection of user flows is associated with a respective measured beneficial impact to an organization and is therefore considered to be impactful. The association can be made automatically or inherently based on some benefit being indicated by the transaction information/metadata. Thus, the determination of impactful flows can be facilitated by examining the metadata of the interaction of the user flows to identify which user flows resulted with some minimum level of confidence in a respective measured benefit to the organization. In this regard, flows might directly provide the benefit or they might be indicative of facilitating of a subsequent flow that provides the benefit. Identification of the impactful flows can therefore include determining (i) first user flows, which are ones that provide their associated respective measured beneficial impact by way of at least one computerized interaction of that user flow itself, and (ii) second user flows that have some threshold correlation to one or more sequentially-later first user flow. For instance, this could include identification of one user flow that includes a revenue-generating transaction that has an associated monetary value of the transaction (say, the purchase price of something), and could include identification of one or more other user flows (which may or may not themselves include an interaction providing a direct beneficial impact) that tend to correlate with the one user flow that included the revenue-generating transaction.

Accordingly, determining the first user flows includes determining, based on the tracking (302), which user flows of the plurality of user flows includes at least one computerized interaction providing a direct beneficial impact, while determining the second user flows includes determining which user flows of the plurality of user flows predict occurrence of at least one of those first user flows. The identification of the second user flows could, for example, be made by determining, across all users, which flows tend to correlate with later-performed first user flows. The process could perform analyses, such as association rule mining for instance, to determine user-flows that tend to (i.e., with at least some level of frequency and/or confidence) lead to future flows, undertaken by a same user, that provide a beneficial impact. This enables the identification of cases where a given flow, while not itself including interaction(s) that provide a measured beneficial impact, tend to indicate (suggest, predict, influence) that a user will interact as part of a later/future flow to provide a future beneficial impact. The second user flows may be very indicative of a subsequent user action to provide the impact, for instance. By way of specific example, if there is a high frequency, across a high portion of unique user identifiers, of a 'read blog post' flow co-occurring within a reasonable time window (for instance, a week) of a later flow that provides a measured beneficial impact, then this could be captured as an association rule indicating that the impact of the first flow is likely associated with the second flow (read blog post). Association rules will give a directional relationship between multiple flows. It should also be appreciated that there might be a sequence of two or more user flows identified that predictably proceed in sequence and eventually lead to a first user flow that provides a benefit, in which case each of the two or more user flows may be considered second user flows that predict occurrence of the first user flow.

Continuing with FIG. 3, the process assigns (308) impact metrics to the collection of user flows, where each user flow of the collection of user flows is assigned a respective impact metric commensurate with the respective measured beneficial impact associated with that user flow. As an example, for each first user flow, and based on the interaction(s) within that first user flow, the assigned impact metric may be based on summing the beneficial impact across those interactions of the flow. There might often be just one interaction of the user flow that provides the beneficial impact, though some flows might include more than one such interaction. Further, for each second user flow, the assigned impact metric can be based on a strength by which that second user flow predicts occurrence of the subsequently occurring first user flow that produced the beneficial impact. In examples, that strength informs a weight used in determining the impact metric of the second user flow. In examples, a process tags second user flows with a weight based on a frequency of the association with impact-generating flow(s), e.g., a flow that is more loosely correlated with an impact-generating flow (a first user flow) can be weighted lower than a flow that almost always leads to an impact-generating flow.

By way of specific example, assuming a first user flow results in a measured beneficial impact of $500, the impact metric assigned to that user flow might be 500 and the impact metric assigned to a second user flow that predicted that first user flow (with some threshold confidence level, for example) might be a weighted version of that impact metric. An example weight might be. 1 based on the second flow predicting occurrence of the first flow at a rate of 10%, meaning that 10% of users who progress through the second flow subsequently progress through the first flow to result in the beneficial impact. In this case, the impact metric assigned to the second user flow could be 0.1*500=50. In an alternative embodiment, an approach might assign the same impact metric to the second user flow as the first user flow. However, it might be the case that other second flows correlate to the first flow and/or the first flow might not always be predicted by a second flow, and in that example it is not the case that the realized impact of 500 is fully attributable to the second user flow, hence a weighting strategy may be employed.

As described above, each user flow is an instance a respective general flow (a 'common flow'), for which there might be multiple instances for various different users in the collection of user flows. Because of this, it might be desired to consider the impact of common flows by aggregating the impact of each instance (i.e. user flow in the collection) of that common flow. Therefore, in some embodiments, the method can aggregate, for each common flow of the plurality of common flows, the impact metrics of user flows, of the collection of user flows, grouped into that common flow to provide a respective aggregated impact for that common flow. In specific examples, the aggregate for a common flow is a sum of the impact metrics of the individual user flows that are grouped together as being instances of that common flow.

A direct corollary to the idea of a beneficial impact and aggregated impact metric for a given common flow is a predicted cost of failure. This can be determined based on data as to a beneficial impact that is expected to be realized over a given period of time when the flow is available (i.e., does not fail). For instance, if a given common flow includes a transaction resulting in a measured beneficial impact of 10 units, and on average that flow and transaction occurs 70 times in a week, a cost of failure per unit of time can be determined (e.g., 700/week, 70/day, etc.) and used to predict the ongoing cost of not resolving an incident negatively affecting that common flow, for instance a failure incident of that flow.

The various common flows-both those for first flows that directly provide the beneficial impact and second flows that predict first flows—can be sorted by their respective predicted costs of failure, and this can take into account the weighting that is applied to second flows. Then, synthetic tests for some or all of the flows can be created/selected, with those with a higher predicted cost of failure/higher beneficial impact when functional being considered higher priority and resulting in higher monitoring rates. In this manner, and based on the assigned impact metrics, a process can select (310, FIG. 3) a collection of synthetic tests of a plurality of common flows represented by the collection of user flows and a prioritization of that collection of synthetic tests. Selected in this context can mean that each is either selected from a collection of existing synthetic tests or created/built at that time. Each synthetic test is designed to test a given common flow by simulating a sequence of user interactions to progress through that common flow. In some examples, the selected tests are directed only to flows that provide a beneficial impact, though in other examples other types of flows may be tested. Synthetic tests can be specifically designed to aggressively attempt to drive/produce errors in the flow, as a means of stress testing the flows if desired.

The prioritization of the tests can account for any parameter according to which the tests are run, for instance frequency of performance of each test, maximum or target resource consumption of each test, and other parameters. The prioritization of the tests can be defined relative to each other (test 1 runs twice as often as test 2) or based on absolute parameters (perform test 1 every other day; perform test 2 every 4 days). Further, prioritization of a given test can be in direct correlation to the impact metric of the associated flow. In embodiments in which a process aggregates, for each common flow of the plurality of common flows, the impact metrics of user flows grouped into that common flow to provide a respective aggregated impact for that common flow, the selection of the collection of synthetic tests and the prioritization of those tests can be based on a ranking of the common flows of the plurality of common flows based on their aggregated impacts. Additionally, since there may be limited capacity (e.g., resources) for testing, the prioritization can be based on a specified capacity allotted for monitoring the plurality of common flows. By way of example to illustrate, there might be 100 units of compute power per day to dedicate to synthetic testing of three different common flows—flow1, flow2, and flow3. The three common flows might have aggregated impacts of 50, 25 and 25 for flow1, flow2, and flow3, respectively, in which case one prioritization might specify that synthetic testing of flow1 (via one or more tests) is allotted 50 units of compute power per day, while synthetic testing of flow2 (via a respective one or more other tests) is allotted 25 units of compute power per day, as is synthetic testing of flow3.

As noted, the selection of the synthetic tests could include generating new test(s) and/or selecting one or more from a set of existing, already defined, synthetic tests. For instance, there could be a set of existing tests and/or templates of tests that are maintained as part of a library of synthetic tests/templates, and the selection of some or all tests could be made from that library. In example, test or template selected from the library is tweaked to make the test compatible with the specific common flow for which the test was selected.

Thus, depending on the number of flows and available monitoring capacity, synthetic tests that act to emulate interactions for flows—for instance all flows or selected flows with generally the higher predicted costs of failure—are selected. They may be set up and executed or scheduled for execution. Referring back to FIG. 2, this is depicted by synthetic monitoring 210 that monitors the generic version of the depicted user flow (i.e., the common flow of which the depicted user flow is an instance). The tests act as a user would, following the same interactions and, if they fail, could generate an incident 212 that can be presented to operators. The rate at which flows are tested can be determined by the relative predicted cost of failure for each flow as described above, with those flows having a higher cost of failure leading to higher monitoring rates thereof. Higher rates have an associated computational cost (and potentially other costs), so the prioritization aspect helps optimize testing to balance risks of failure of the flows with the generation of beneficial impacts from the flows. In some embodiments, the monitoring rates of each flow can automatically be optimized based on the computation cost and associated monetary cost, as just some examples of the costs involved in testing. For example, an administrator or other entity could input to a system the cost of a unit of central processing unit power or a paid—for synthetic test service, and the system can use that information to associate a resource cost to each synthetic test run. The rate of running a synthetic test may be set by the system such that the cost of running the test is equal or smaller to the predicted cost of failure multiplied by the mean time to resolution for an incident. As the predicted failure costs and resource usage costs vary, the system can automatically optimize and update the monitoring rates.

In some examples, the process also executes the collection of selected synthetic tests according to the selected prioritization. The process can gather results of the synthetic test runs and can perform further actions based thereon. For instance, a process could, based on failure of a synthetic test (a failure result) for a flow, automatically raise an incident with a priority that the process sets based on the relative predicted cost of failure for that flow. In this manner, and based on a failure during execution of a synthetic test of a common flow, the process might raise an event with a priority set based on a predicted impact of failure of the common flow, which predicted impact of failure is a function of the aggregated impact for that common flow. The process could notify the appropriate operator(s), which could be a human or automated operator, of the incident and the priority. The operator can use the priority for a remediation decision about how to prioritize the handling and fixing of the incident. An automated operator, for example, could use the indicated priority to automatically prioritize its work on the incident relative to its work on other in-process incidents that it is handling. Additionally or alternatively, the priority can be used to determine specific operator(s) and/or other entities should be notified about the incident. For instance, a process might automatically escalate high priority incidents to a more senior operator.

Figure 4:
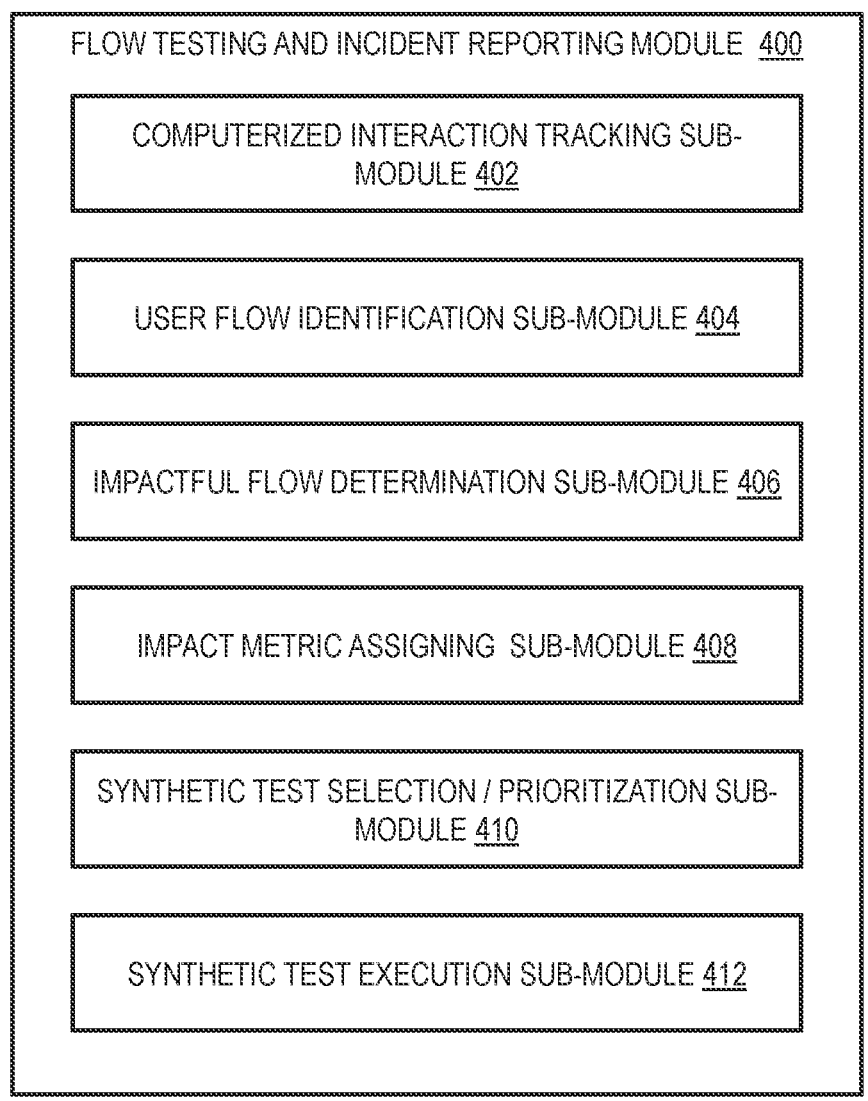
FIG. 4 depicts further details of an example flow testing and incident reporting module to incorporate and/or use aspects described herein.

FIG. 4 depicts further details of an example flow testing and incident reporting module (e.g., flow testing and incident reporting module 400 of FIG. 1) to incorporate and/or use aspects described herein. In one or more aspects, flow testing and incident reporting module 400 includes, in one example, various sub-modules to be used to perform flow testing and incident reporting. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 4 flow testing and incident reporting module 400 includes computerized interaction tracking sub-module 402 for tracking computerized interactions of users interacting via user interfaces with system(s), user flow identification sub-module 404 for identifying, from the computerized interactions, user flows, where each user flow is a sequence of one or more of the tracked computerized interactions, impactful flow determination sub-module 406 for determining a collection of user flows, where each user flow of the collection of user flows is associated with a respective measured beneficial impact to an organization, impact metric assigning sub-module 408 for assigning impact metrics to the collection of user flows, synthetic test selection/prioritization sub-module 410 for, based on the assigned impact metrics, selecting a collection of synthetic tests of a plurality of common flows represented by the collection of user flows and a prioritization of the collection of synthetic tests, and synthetic test execution sub-module 412 for executing the collection of synthetic tests according to the prioritization.

Figure 5:
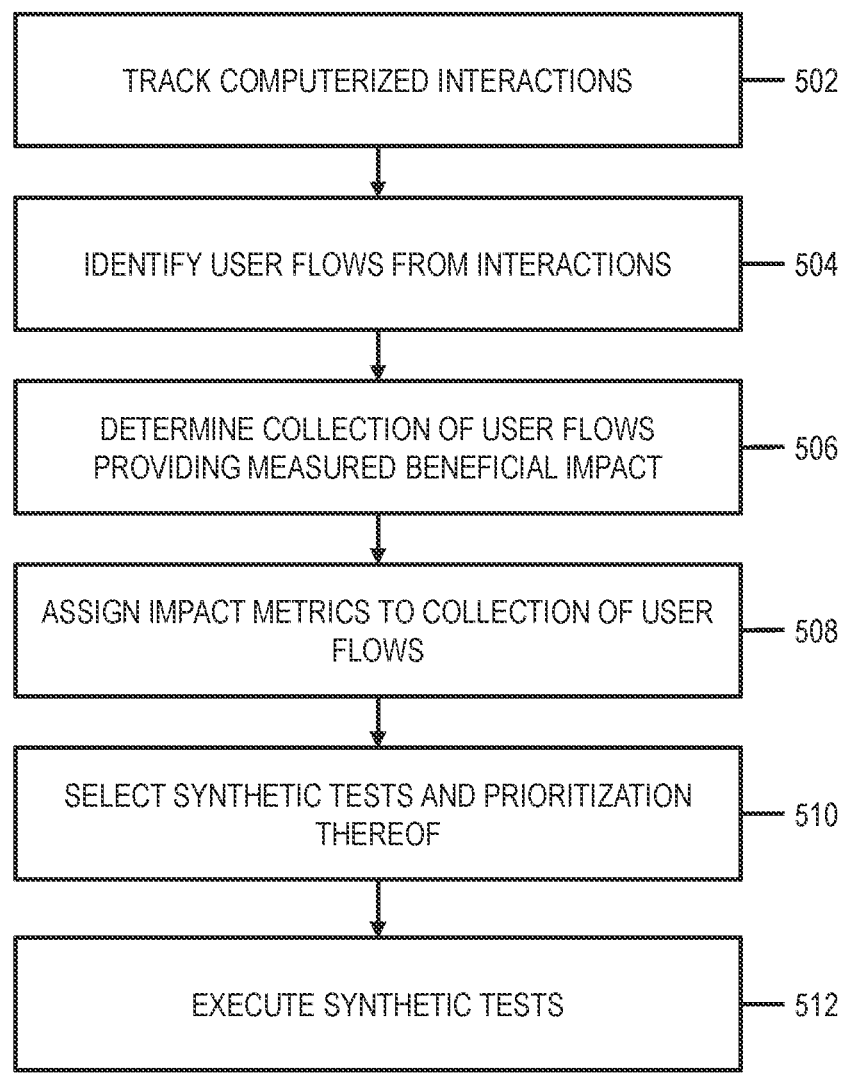
FIG. 5 depicts an example process for prioritized flow testing and incident reporting, in accordance with aspects described herein.

FIG. 5 depicts an example process for prioritized flow testing and incident reporting, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 5 are part of a module, such as module 400. In other examples, the code may be included in one or more modules and/or in one or more sub-modules of the one or more modules. Various options are available.

The process of FIG. 5 includes tracking (502) computerized interactions of a plurality of users interacting via user interfaces with one or more systems. In embodiments, the tracking of the computerized interactions includes storing metadata for each computerized interaction of the computerized interactions. The metadata for a computerized interaction can include, for instance, (i) a unique identifier of a user performing the computerized interaction, (ii) an identifier of a current session of the user, (iii) an identifier of an element with which the user interacted, and/or (iv) an originating identifier.

The process of FIG. 5 continues by identifying (504), from the computerized interactions, a plurality of user flows. Each user flow of the plurality of user flows is a sequence of one or more of the tracked computerized interactions. In embodiments, the identifying of the plurality of user flows includes analyzing the stored metadata and determining, as a user flow of the plurality of user flows, sequential user interactions of a single user in a single session.

Continuing with FIG. 5, the process determines (506) a collection of user flows of the plurality of user flows, where each user flow of the collection of user flows is associated with a respective measured beneficial impact to an organization. The determining the collection of user flows includes determining first user flows, each first user flow of the first user flows providing its associated respective measured beneficial impact by way of at least one computerized interaction of that first user flow. In examples, for each of the first user flows, the metadata stored further includes a measurement of the beneficial impact. The determining of the collection of user flows also includes determining second user flows, each second user flow having a threshold correlation to one or more of the first user flows that occur sequentially after that second user flow.

In embodiments, the determining of the first user flows includes determining, based on the tracking, which user flows of the plurality of user flows include at least one computerized interaction providing a direct beneficial impact, and the determining of the second user flows includes determining which user flows of the plurality of user flows predict occurrence of at least one of the first user flows.

FIG. 5 also includes assigning (508) impact metrics to the collection of user flows. Each user flow of the collection of user flows is assigned a respective impact metric commensurate with the respective measured beneficial impact associated with that user flow. The assigning of the impact metrics can include assigning a weighted impact metric to a second user flow based on a strength by which the second user flow predicts occurrence of a subsequently occurring first user flow.

Based on the assigned impact metrics, the process of FIG. 5 selects (510) a collection of synthetic tests of a plurality of common flows represented by the collection of user flows and a prioritization of the collection of synthetic tests. Each synthetic test simulates a sequence of user interactions to progress through a respective common flow of the plurality of common flows. In some embodiments, the process aggregates, for each common flow of the plurality of common flows, the impact metrics of user flows, of the collection of user flows, grouped into that common flow. This provides a respective aggregated impact for that common flow. The selection of the collection of synthetic tests and the prioritization can be based on a ranking of the common flows of the plurality of common flows based on their aggregated impacts. Additionally or alternatively, the prioritization can be based on a specified capacity allotted for monitoring the plurality of common flows.

The process of FIG. 5 also includes executing (512) the collection of synthetic tests according to the prioritization. In some embodiments, the process also, based on a failure during execution of a synthetic test, of the collection of synthetic tests, of a common flow, of the plurality of common flows, includes raising an event with a priority set based on a predicted impact of failure of the common flow, where the predicted impact of failure of the common flow is a function of the aggregated impact for that common flow.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   tracking computerized interactions of a plurality of users interacting via user interfaces with one or more systems;
   identifying, from the computerized interactions, a plurality of user flows, each user flow of the plurality of user flows being a sequence of one or more of the tracked computerized interactions;
   determining a collection of user flows of the plurality of user flows, each user flow of the collection of user flows being associated with a respective measured beneficial impact to an organization, wherein the determining the collection of user flows comprises:
  determining first user flows, each first user flow of the first user flows providing its associated respective measured beneficial impact by way of at least one computerized interaction of that first user flow; and
  determining second user flows, each second user flow having a threshold correlation to one or more of the first user flows that occur sequentially after that second user flow;
assigning impact metrics to the collection of user flows, wherein each user flow of the collection of user flows is assigned a respective impact metric commensurate with the respective measured beneficial impact associated with that user flow;
based on the assigned impact metrics, selecting a collection of synthetic tests of a plurality of common flows represented by the collection of user flows and a prioritization of the collection of synthetic tests, wherein each synthetic test simulates a sequence of user interactions to progress through a respective common flow of the plurality of common flows; and
aggregating, for each common flow of the plurality of common flows, the impact metrics of user flows, of the collection of user flows, grouped into that common flow to provide a respective aggregated impact for that common flow, wherein the selecting the collection of synthetic tests an prioritization is based on a ranking of the common flows of the plurality of common flows based on their aggregated impacts.

2. The method of claim 1, wherein the determining the first user flows comprises determining, based on the tracking, which user flows of the plurality of user flows comprise at least one computerized interaction providing a direct beneficial impact, and wherein the determining the second user flows comprises determining which user flows of the plurality of user flows predict occurrence of at least one of the first user flows.

3. The method of claim 2, wherein the assigning the impact metrics comprises assigning a weighted impact metric to a second user flow based on a strength by which the second user flow predicts occurrence of a subsequently occurring first user flow.

4. The method of claim 2, wherein the tracking the computerized interactions comprises storing metadata for each computerized interaction of the computerized interactions, the metadata for a computerized interaction comprises:
  (i) a unique identifier of a user performing the computerized interaction;
  (ii) an identifier of a current session of the user;
  (iii) an identifier of an element with which the user interacted; and
  (iv) an originating identifier.

5. The method of claim 4, wherein for each of the first user flows, the metadata stored further comprises a measurement of the beneficial impact.

6. The method of claim 4, wherein the identifying the plurality of user flows comprises analyzing the stored metadata and determining, as a user flow of the plurality of user flows, sequential user interactions of a single user in a single session.

7. The method of claim 1, wherein the prioritization is based on a specified capacity allotted for monitoring the plurality of common flows.

8. The method of claim 1, further comprising executing the collection of synthetic tests according to the prioritization.

9. The method of claim 8, further comprising, based on a failure during execution of a synthetic test, of the collection of synthetic tests, of a common flow, of the plurality of common flows, raising an event with a priority set based on a predicted impact of failure of the common flow, the predicted impact of failure of the common flow being a function of the aggregated impact for that common flow.

10. A computer system comprising:
  a memory; and
  a processor in communication with the memory, wherein the computer system is configured to perform a method comprising:
    tracking computerized interactions of a plurality of users interacting via user interfaces with one or more systems;
    identifying, from the computerized interactions, a plurality of user flows, each user flow of the plurality of user flows being a sequence of one or more of the tracked computerized interactions;
    determining a collection of user flows of the plurality of user flows, each user flow of the collection of user flows being associated with a respective measured beneficial impact to an organization, wherein the determining the collection of user flows comprises:
      determining first user flows, each first user flow of the first user flows providing its associated respective measured beneficial impact by way of at least one computerized interaction of that first user flow; and
      determining second user flows, each second user flow having a threshold correlation to one or more of the first user flows that occur sequentially after that second user flow;
    assigning impact metrics to the collection of user flows, wherein each user flow of the collection of user flows is assigned a respective impact metric commensurate with the respective measured beneficial impact associated with that user flow;
    based on the assigned impact metrics, selecting a collection of synthetic tests of a plurality of common flows represented by the collection of user flows and a prioritization of the collection of synthetic tests, wherein each synthetic test simulates a sequence of user interactions to progress through a respective common flow of the plurality of common flows, and
    aggregating, for each common flow of the plurality of common flows, the impact metrics of user flows, of the collection of user flows, grouped into that common flow to provide a respective aggregated impact for that common flow, wherein the selecting the collection of synthetic tests and the prioritization is based on a ranking of the common flows of the plurality of common flows based on their aggregated impacts.

11. The computer system of claim 10, wherein the determining the first user flows comprises determining, based on the tracking, which user flows of the plurality of user flows comprise at least one computerized interaction providing a direct beneficial impact, and wherein the determining the second user flows comprises determining which user flows of the plurality of user flows predict occurrence of at least one of the first user flows.

12. The computer system of claim 11, wherein the assigning the impact metrics comprises assigning a weighted impact metric to a second user flow based on a strength by which the second user flow predicts occurrence of a subsequently occurring first user flow.

13. The computer system of claim 10, wherein the method further comprises:
  executing the collection of synthetic tests according to the prioritization; and
  based on a failure during execution of a synthetic test, of the collection of synthetic tests, of a common flow, of the plurality of common flows, raising an event with a priority set based on a predicted impact of failure of the common flow, the predicted impact of failure of the common flow being a function of the aggregated impact for that common flow.

14. A computer program product comprising:
  a computer readable storage medium readable by a processing circuit and storing instructions for execution by the processing circuit to:
    tracking computerized interactions of a plurality of users interacting via user interfaces with one or more systems;
    identifying, from the computerized interactions, a plurality of user flows, each user flow of the plurality of user flows being a sequence of one or more of the tracked computerized interactions;
    determining a collection of user flows of the plurality of user flows, each user flow of the collection of user flows being associated with a respective measured beneficial impact to an organization, wherein the determining the collection of user flows comprises:
      determining first user flows, each first user flow of the first user flows providing its associated respective measured beneficial impact by way of at least one computerized interaction of that first user flow; and
      determining second user flows, each second user flow having a threshold correlation to one or more of the first user flows that occur sequentially after that second user flow;
    assigning impact metrics to the collection of user flows, wherein each user flow of the collection of user flows is assigned a respective impact metric commensurate with the respective measured beneficial impact associated with that user flow; and
    based on the assigned impact metrics, selecting a collection of synthetic tests of a plurality of common flows represented by the collection of user flows and a prioritization of the collection of synthetic tests, wherein each synthetic test simulates a sequence of user interactions to progress through a respective common flow of the plurality of common flows; and
    aggregating for each common flow of the plurality of common flows, the impact metrics of user flows, of the collection of user flows, grouped into that common flow to provide a respective aggregated impact for that common flow, wherein the selecting the collection of synthetic tests and the prioritization is based on a ranking of the common flows of the plurality of common flows based on their aggregated impacts.

15. The computer program product of claim 14, wherein the determining the first user flows comprises determining, based on the tracking, which user flows of the plurality of user flows comprise at least one computerized interaction providing a direct beneficial impact, and wherein the determining the second user flows comprises determining which user flows of the plurality of user flows predict occurrence of at least one of the first user flows.

16. The computer program product of claim 15, wherein the assigning the impact metrics comprises assigning a weighted impact metric to a second user flow based on a strength by which the second user flow predicts occurrence of a subsequently occurring first user flow.

17. The computer program product of claim 14, wherein the method further comprises:
  executing the collection of synthetic tests according to the prioritization; and
  based on a failure during execution of a synthetic test, of the collection of synthetic tests, of a common flow, of the plurality of common flows, raising an event with a priority set based on a predicted impact of failure of the common flow, the predicted impact of failure of the common flow being a function of the aggregated impact for that common flow.

* * * * *